United States Patent [19]

Saitoh et al.

[11] 4,040,949
[45] Aug. 9, 1977

[54] METHOD FOR SEPARATION OF MIXTURE OF POLYESTER AND CELLULOSE DERIVATIVE

[75] Inventors: Kozo Saitoh, Tokyo; Sumio Izumi, Kokubunji, both of Japan

[73] Assignee: Mitsui Mining & Smelting Co., Ltd., Tokyo, Japan

[21] Appl. No.: 612,150

[22] Filed: Sept. 10, 1975

Related U.S. Application Data

[63] Continuation of Ser. No. 469,723, May 14, 1974, Pat. No. 3,941,688.

[30] Foreign Application Priority Data

Dec. 8, 1973  Japan ............................... 48-138254
Dec. 8, 1973  Japan ............................... 48-138255

[51] Int. Cl.$^2$ .............................................. B03D 1/02
[52] U.S. Cl. .................................................... 209/166
[58] Field of Search ................................ 209/166, 167

[56] References Cited

U.S. PATENT DOCUMENTS

| 3,284,282 | 11/1966 | Immez | 209/1 |
| 3,433,356 | 3/1969 | Sommer | 209/164 |
| 3,479,281 | 11/1969 | Kikindai | 209/164 X |
| 3,557,956 | 1/1971 | Brown | 162/4 X |
| 3,849,245 | 11/1974 | Marsh | 162/4 |

Primary Examiner—Robert Halper
Attorney, Agent, or Firm—Sughrue, Rothwell, Mion, Zinn and Macpeak

[57] ABSTRACT

A method for the separation of a mixture of a polyester and a cellulose derivative comprising introducing gas bubbles into an aqueous liquid medium containing the mixture of the polyester and the cellulose derivative, optionally in the presence of at least one wetting agent and at least one flotation agent thereby separating the mixture by flotation into the polyester and the cellulose derivative.

3 Claims, No Drawings ated with the wetting agent and the flotation agent described above is used.

METHOD FOR SEPARATION OF MIXTURE OF POLYESTER AND CELLULOSE DERIVATIVE

This is a Continuation of application Ser. No. 469,723, filed May 14, 1974 now U.S. Pat. No. 3,941,688.

BACKGROUND OF THE INVENTION

1. FIELD OF THE INVENTION

This invention relates to a method for the separation of a mixture of a polyester and a cellulose derivative. More particularly, this invention relates to a method for the separation of a mixture of a polyester and a cellulose derivative into each material by introducing gas bubbles in an aqueous liquid medium containing the mixture of the polyester and the cellulose derivative.

2. DESCRIPTION OF THE PRIOR ART

No method for separating a mixture of a polyester and a cellulose derivative is known due to the close similarity in physical properties, such as specific gravity and the like, of these materials. Therefore, a mixture of a polyester and a cellulose derivative, for example, film scraps resulting from the manufacturing of photograhic films, has been disposed of as a waste material.

SUMMARY OF THE INVENTION

An object of this invention is to provide a method for easily and efficiently separating a mixture of a polyester and a cellulose derivative into each of the materials.

The present invention provides a method for separating a polyester from a cellulose derivative which comprises introducing gas bubbles into an aqueous liquid medium containing a mixture of the polyester and the cellulose derivative and thereby floating the polyester. An embodiment includes a method for separating a cellulose derivative from a polyester which comprises introducing gas bubbles into an aqueous liquid medium containing a mixture of a polyester and a cellulose derivative in the presence of a wetting agent and a flotation agent and thereby floating the cellulose derivative.

DETAILED DESCRIPTION OF THE INVENTION

As a result of extensive studies on methods for the separation of a mixture of a polyester and a cellulose derivative, the present inventors found that a polyester and a cellulose derivative differ from each other in wettability by water, i.e., the cellulose derivative is wettable by water whereas the polyester is hardly wettable by water, and therefore, polyester which is hydrophobic can be floated due to adherence of the bubbles to the polyester thereby floating the polyester. The inventors also found that if a wetting agent is present in the water the polyester can be rendered more hydrophilic than the cellulose derivative whereby the cellulose derivative can be floated by adhering to bubbles introduced in the presence of the flotation agent. The method of this invention is based on these findings.

The term "polyester" as used throughout the specification and appended claims is employed to designate high molecular weight substances having an ester bond in their main chain and includes materials such as polyethylene terephthalate, alkyd resins, unsaturated polyester resins, maleic acid resins and the like.

The cellulose derivatives to which the method of this invention is applicable include cellulose diacetate, cellulose triacetate, nitrocellulose and the like.

The shapes and sizes of the polyester and the cellulose derivative subjected to the method according to the present invention are not critical and can vary. It is suitable, however, that the mixture of these materials be comminuted into pieces having a size less than about 50 mm, preferably 1 to 10 mm either as a film or granules where a large quantity is to be treated.

In a first embodiment of the present invention wherein a cellulose dirivative is floated, a mixture of the polyester and the cellulose derivative is mixed with an aqueous liquid medium such as water or salt water and at least one wetting agent. Suitable examples of wetting agents are alkali metal and alkaline earth metal salts of lignin sulfonic acid such as sodium lignin sulfonate, calcium lignin sulfonate, magnesium lignin sulfonate, etc., an organic colloid and mixtures thereof. The term "organic colloid" used herein refers to hydrophilic organic colloids which render the surface of the polyester more hydrophilic than the surface of the cellulose derivative thereby increasing the wetting characteristics of the cellulose derivative. Such hydrophilic organic colloids are well known in the art in the field of ore processing as described in, for example, A.F. Taggart, *Handbook of Mineral Dressing Ores and Industrial Minerals*, 1948, 12-33 to 12-34, John Wiley and Sons, Inc., New York. Suitable examples of the hydrophilic organic colloid which can be used in the present invention are tannic acid, a quebracho extract, gelatin, glue, saponin and the like. These hydrophilic organic colloids can be used alone or as a mixture of two or more colloids. The amount of the wetting agent employed suitably is up to about 1,000 g per ton, preferably 10 to 500 g per ton, of the raw material (i.e., the mixture of the polyester and the cellulose derivative). It is desirable that the mixture of the raw material and the aqueous liquid medium be stirred for several minutes after the addition of the wetting agent. To the resulting mixture is further added at least one flotation agent. Suitable examples are conventionally known flotation agents such as pine oil, kerosene, cresylic acid, eucalyptus oil, camphor oil, higher alcohols such as propyl alcohol, amyl alcohol, etc. methyl isobutyl carbinol, pyridine, o-toluidine and the like. A suitable amount of the flotation agent is up to about 1,000 g per ton, preferably 100 to 500 g per ton, of the raw material. Gas bubbles are then introduced into the aqueous liquid medium thereby floating the cellulose derivative.

In this first embodiment of the present invention, due to the wetting agent the surface of the polyester which is hydrophobic in nature becomes more hydrophilic than the surface of the cellulose derivative. Gas bubbles are then introduced into the aqueous liquid medium in the presence of the above-described flotation agent whereby the cellulose derivative can be floated and separated.

In the second embodiment of the present invention wherein a polyester is floated, the separation of the polyester and the cellulose derivative can be carried out by introducing gas bubbles into an aqueous liquid medium containing a mixture of the polyester and cellulose derivative whereby the hydrophobic polyester is adhered to gas bubbles to float while the hydrophilic cellulose derivative remains in the aqueous liquid medium.

In this second embodiment of the present invention the above described flotation agent can optionally be employed. The flotation agent can be suitably used in a proportion of less than about 200 g per ton of the raw material thereby promoting the floating separation of the polyester.

The separation tank which can be used in the present invention can be any type of tank such as a tank which is tetragonal type, regular or non-regular polygonal or circular and the tank can be a trough type, a thickner type or a cyclone type tank.

The generation of gas bubbles can be effected using mechanical stirring, bubbling a gas through the medium, release of a gas dissolved under pressure, evacuation to release dissolved gases, electrolysis or a combination of two or more of these methods. The gases which can suitably be used include air, oxygen, nitrogen, carbon dioxide, inert gases such as argon, etc.

A suitable proportion of the raw material, i.e., the mixture of the polyester and the cellulose derivative, to be separated and the aqueous liquid medium in the separation tank can range from about 0.1 to about 10 parts by weight of the mixed materials per 100 parts by weight of the mixture. The temperature of the aqueous liquid medium is not critical in the method of this invention, but is preferably in the range of from about 0° to about 70° C, most preferably at an environment temperature (about 15° to about 35° C). Temperatures below about 0° C are practically not preferred since at such low temperatures the efficiency of separation of the mixture in the flotation tends to decrease. On the other hand, the use of a temperature higher than about 70° C makes the method of the present invention uneconomical and, in addition, such a higher temperature is not desirable from the standpoint of the working environment. The aqueous liquid medium is usually employed at room temperature but separation by flotation can be promoted by heating the aqueous liquid medium.

The present invention is carried out in an aqueous liquid medium which includes water and salt water. Suitable examples of salt water include sea water, brine, bittern-containing water as well as aqueous solutions containing halides such as NaCl, $MgCl_2$ and $MgBr_2$, etc., sulfates such as $MgSO_4$, $CaSO_4$, $K_2SO_4$ and $Na_2SO_4$, etc. and bicarbonates such as $Ca(HCO_3)_2$ and $NaHCO_3$, etc. Water generally is employed as the aqueous liquid medium.

Further, the presence of inorganic or organic substances, such as those substances contaminating river water, industrial water, etc., in the aqueous liquid medium does not interfere with the present invention.

As previously described, the present invention provides a method for separating a mixture of a polyester and a cellulose derivative, for example, arising in the manufacture of photographic films into each of the components of the mixture with an excellent efficiency by utilizing the surface wettability of the mixture of materials and, in case of floating the cellulose derivative, using a wetting agent. The present invention makes it possible to convert a waste material which has hitherto been disposed of into a reusable material as a fresh raw material and therefore has a great advantage from the standpoint of resource utilization.

The present invention will now be illustrated in greater detail by the following examples. In these examples all parts, percentages, ratios and the like are by weight unless otherwise indicated.

EXAMPLE 1

A mixture of 50 parts of polyester and 50 parts of cellulose triacetate both obtained from film scraps arising from the manufacture of photographic films after removal of the silver halide emulsion coated thereon was cut into pieces having a size less than 10 mm and 100 g of the resulting pieces was placed in a separation tank of a rectangular type containing 8000 ml of water. Tannic acid was added thereto as a wetting agent in a proportion of 250 g per ton of the raw material pieces followed by stirring for 2 minutes. 200 g of pine oil was placed in the tank as a flotation agent. The mixture was separated into a float and a residue while introducing gas bubbles into the water for a period of 10 minutes. Cellulose triacetate contents in the resulting float and residue thus separated were determined by measuring the soluble matter in the float and the residue using methylene chloride containing 10% methanol.

As a result of the above separation, 46 parts of the polyester having a purity of 99.1% was collected as a residue but the float, cellulose triacetate, was found to contain a small amount of the polyester. 100 g of tannic acid and 100 g of pine oil per ton of the raw material were added to the float and cleaning was carried out by introducing gas bubbles into the water for 5 minutes to collect 46.5 parts of cellulose triacetate having a purity of 97.5% as a final float. The intermediate product in which both the cellulose triacetate and the polyester were present was found to be 7.5 parts by weight.

Since the final float and residue thus separated had a remarkably high purity, each could be reused as a raw material for the manufacturing of films and other products.

In the same manner as described above, mixtures of various combinations of an alkyd resin, an unsaturated polyester resin, a maleic acid resin and the like with cellulose diacetate, cellulose triacetate, nitrocellulose and the like were separated into each component.

EXAMPLE 2

A mixture of 50 parts of a polyester and 50 parts of cellulose triacetate both obtained from film scraps arising from the manufacturing of photographic films after the removal of the silver halide emulsion coated thereon was cut into pieces having a size less than about 6 mm. 100 g of the resulting pieces was placed in a rectangular type separation tank containing 8000 ml of water followed by introducing gas bubbles into the water for a period of 2 minutes thereby separating the mixed material into a float and a residue. The cellulose triacetate contents in the float and in the residue thus separated were determined by measuring the soluble matter contained therein using methylene chloride containing 10% methanol.

As a result of the above separation, 47.0 parts of cellulose triacetate having a purity of 99.8% was collected as residue but it was found that the float, the polyester, contained a small amount of cellulose triacetate. Gas bubbles were introduced twice into water for 3 minutes to clean the float thereby collecting 48.5 parts of the polyester having a purity of 100% as a final float. The intermediate product in which both the polyester and the cellulose triacetate were present was found to be 4.5 parts.

Since the final float and the residue thus separated have a high purity, each could be reused as a raw material for the manufacture of films and other products.

In the same manner as described above, mixtures of various combinations of an alkyd resin, an unsaturated polyester resin, a maleic acid resin, and the like with cellulose diacetate, cellulose triacetate, nitrocellulose and the like were separated into each component.

While the invention has been described in detail and with reference to specific embodiments thereof, it will be apparent to one skilled in the art that various changes and modifications can be made therein without departing from the spirit and scope thereof.

What is claimed is:

1. A method for the separation of a mixture of a polyester and a cellulose plastic derivative selected from the group consisting of cellulose diacetate, cellulose triacetate and nitrocellulose consisting of introducing gas bubbles into a dispersion of a mixture of said polyester and said cellulose derivative, said polyester and said cellulose derivative being solid pieces having a size of 1 to 50 mm, in an aqueous liquid medium, thereby floating said polyester from separating said polyester and said cellulose derivative.

2. The method as claimed in claim 1, wherein said mixture is present in an amount of about 0.1 to about 10 parts by weight per 100 parts by weight of said aqueous liquid medium.

3. The method as claimed in claim 1, wherein said aqueous liquid medium is water or salt water.

* * * * *